May 13, 1930.  M. F. CARR  1,758,907
SEPARABLE SNAP FASTENER ELEMENT
Filed April 18, 1928
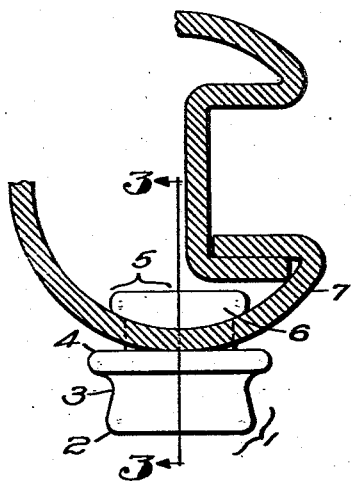
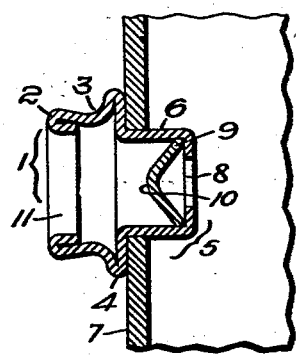 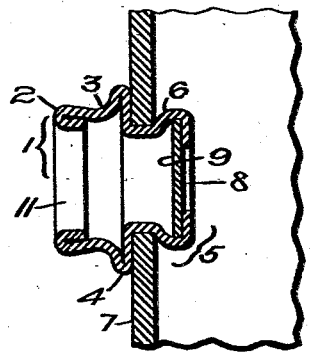
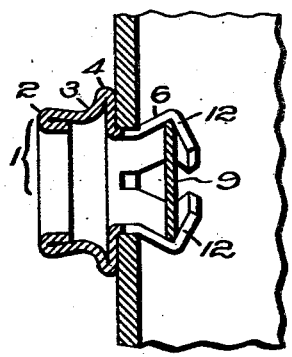
Inventor:
Moses F. Carr,
by Emery, Booth, Janney & Varney
Attys Patented May 13, 1930

1,758,907

UNITED STATES PATENT OFFICE

MOSES F. CARR, OF LEXINGTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE SNAP-FASTENER ELEMENT

Application filed April 18, 1928. Serial No. 270,914.

My invention aims to provide improvements in separable fasteners and more particularly to fastener elements which are adapted to be secured to sheet metal structures which are inaccessible at their inner faces.

In the drawings, which illustrate preferred embodiments of my invention:—

Figure 1 is a plan section taken through a portion of a wind shield post showing a stud secured thereto in accordance with the invention;

Fig. 2 is a section showing a portion of a supporting structure and a fastener member before the attaching means has been expanded;

Fig. 3 is a section taken on the line 2—2 of Figure 1; and

Fig. 4 is a vertical section showing a second form of stud member as it appears when attached to a supporting structure.

Referring to the embodiments of my invention illustrated by the drawings, I have shown snap fastener members which are particularly, though not exclusively, adapted for attachment to a relatively thin supporting structure such as sheet metal.

The fastener member shown in Figs. 1, 2 and 3 is provided with a hollow body portion preferably formed from a single piece of sheet metal pressed out to the desired shape. In this instance, I have provided a socket-receiving portion 1 at one end which includes the head portion 2, the neck 3 and the base flange 4. At the other end, I have provided a cup-shaped attaching portion 5 integral with the flange 4 and having an outer peripheral wall 6 which is adapted to be expanded to secure the fastener member to a support 7, as shown in Figs. 1 and 3.

The attaching portion is preferably provided with a bottom in which a hole 8 is formed to aid in attachment of the fastener, as hereinafter described.

Within the cup-shaped attaching portion 5, I have assembled an expansible disc 9 having a hump portion 10, as illustrated by Fig. 2. The disc 9 preferably fits tightly against the inner face of the wall 6 so as not to fall out of place during shipment of the fasteners.

At the outer end of the socket-receiving portion 1, the metal is bent inwardly so that it extends into the interior of the body portion and surrounds an aperture 11 through which access may be had to the hump 10 of the disc 9.

The method of attaching the fastener element above described is simple and particularly adapted for securing snap fastener elements to sheet metal objects and for use on objects such as wind shield posts (Fig. 1) the inside of which is not accessible. Furthermore, the attachment is such that only a relatively small space is required beyond the inner face of the object.

When securing a fastener unit to a wind shield post, as shown in the drawings, the attaching portion 2 is passed into a preformed hole, as shown in Fig. 2. Then a suitable tool is pressed against the end of the hump 10 to flatten it and expand the disc 9 which in turn expands the wall 6 of the attaching portion beyond the inner face of the wall of the post, as shown in Figs. 1 and 3. The hole 8 in the bottom of the attaching portion aids in permitting the metal to expand more readily.

In Fig. 4, I have illustrated a fastener unit which is the same in all respects to that shown and described in connection with Figs. 1 through 3, except that the cup portion 5 is divided by a number of slits 12 which make it somewhat easier to expand the cup portion 5.

While I have illustrated and described preferred embodiments of the invention, I do not wish to be limited thereto, therefore, reference should be made to the following claims to indicate the scope of my invention.

Claims:

1. A snap fastener member comprising a fastener-receiving portion, a cup-shaped attaching portion extending from said fastener-receiving portion, and a disc-like member located within said cup-shaped member and having a hump which is adapted to be flattened to enlarge the diameter of said disc-like member, thereby to expand the peripheral wall of said cup-shaped attaching portion.

2. A snap fastener member comprising a fastener-receiving portion, a cup-shaped attaching portion integral with and extending from the said fastener-receiving portion and a relatively thin disc assembled within said attaching portion and having a hump formed therein whereby when flattened said disc will take the form of a flat enlarged plate and thereby expand the peripheral wall of the attaching portion.

3. A snap fastener stud comprising a socket-receiving portion 1, an attaching portion 5 having slits 12, and an expansible disc 9 having a hump 10 formed therein whereby when said expansible disc 9 is flattened it will take the form of a flat enlarged plate and thereby expand the peripheral wall 6 of the attaching portion 5.

In testimony whereof, I have signed my name to this specification.

MOSES F. CARR.